March 29, 1960  E. L. COOK ET AL  2,930,332
RAILWAY BOX CARS AND DOORS THEREFOR
Filed Oct. 18, 1956  5 Sheets-Sheet 2

INVENTORS
ELMO L. COOK
WILFRED A. BEAUCHAMP
BY
ATT'Y

March 29, 1960 E. L. COOK ET AL 2,930,332
RAILWAY BOX CARS AND DOORS THEREFOR
Filed Oct. 18, 1956 5 Sheets-Sheet 3

INVENTORS
ELMO L. COOK
WILFRED A. BEAUCHAMP
BY Samuel Reese
ATTY.

United States Patent Office 2,930,332
Patented Mar. 29, 1960

2,930,332

RAILWAY BOX CARS AND DOORS THEREFOR

Elmo Lee Cook, deceased, late of Norfolk, Va., by Earl W. Cook, administrator, Roanoke, Va., and Wilfred A. Beauchamp, Chicago, Ill., assignors to The Youngstown Steel Door Company, Cleveland, Ohio, a corporation of Ohio Application October 18, 1956, Serial No. 616,879

10 Claims. (Cl. 105—378)

This invention relates to railway box cars and doors therefor and is concerned particularly with such cars so constructed as to greatly facilitate the loading and unloading of lumber and other bulky commodities and with doors of such construction and so arranged as to permit the accomplishment of the indicated purpose.

Prior to applicants' invention the loading and unloading of lumber, for example, in railway box cars was a tedious, time-consuming and expensive operation. Loading and unloading proceeded from only one side of a box car. In loading, one board at a time was placed in the car and in unloading, one board at a time was removed from the car. Similarly each board had to be handled individually when being removed from or added to piles of lumber in the lumber yard. As the length of the boards increased the time and expense involved in loading and unloading box cars and in stacking and removing lumber increased correspondingly. Moreover this situation was seriously aggravated by the size and location of the door openings in the side walls of box cars.

The instant invention substantially overcomes the objections heretofore encountered in lumber handling and shipping. By virtue of the invention lumber can be palletized thereby eliminating handling of individual boards. Handling and loading and unloading operations have become mechanized, thereby substantially reducing the amount of manual labor required. Lift trucks can be employed to perform the operations of loading and unloading and stacking of lumber and other bulky commodities. The time required for commodities handling has been reduced from many hours to minutes and the savings in the number of man hours involved in these operations is very substantial. The invention thereby achieves a significant and important reduction in the cost of material handling. Moreover, the invention provides a new and more economical box car construction for the attainment of the foregoing accomplishments.

It is an object of this invention to provide railway box cars and doors therefor which shall eradicate the faults inherent in the present procedures of handling lumber and other bulky commodities.

A further object is to provide railway box cars so constructed as to permit palletized loading and unloading.

A further object is to provide railway box cars so constructed as to permit a very substantial reduction in the number of man hours required for loading and unloading and a notable reduction in the cost of handling.

A further object is to provide railway box cars having sides formed with door openings of exceptional width and of such construction that the heights of car and door openings are not sacrificed.

A further object is to provide railway box cars having sides formed with door openings located in diagonally opposite ends of the sides.

A further object is to provide railway box cars having sides formed with door openings of exceptional width and so located as to permit the elimination of one door post in each car side wall.

A further object is to provide railway box cars having sides formed with door openings of exceptional width and so disposed as to permit loading and unloading of the cars simultaneously from both sides.

A further object is to provide railway box cars having sides formed with door openings of exceptional width and so related to the side walls as to permit mechanized loading and unloading of the car including lumber of long lengths.

A further object is to provide railway box cars having sides formed with door openings of exceptional width adapted to be closed by double doors so constructed and arranged as to completely uncover the door openings without requiring an increase in the length of the cars.

A further object is to provide railway box cars having sides formed with door openings of exceptional width adapted to be closed by double doors so constructed and mounted on the cars as to lie in laterally overlapping relationship when open.

Other objects of the invention will become clear as the description thereof proceeds.

In the drawings forming part of this specification.

Referring to the drawings wherein a preferred embodiment of the invention is illustrated the numeral 10 designates in its entirety a railway box car of conventional length. The box car 10 embodies an underframe including side sills, one of which is designated by the reference numeral 11 and which is reinforced by a channel-shaped member 12. Box car 10 also embodies side walls 13 and 14, end walls 15 and 16 and a roof 17. As is customary in box car construction the roof is adapted to be supported upon side and end plates, one of the former being designated by the reference numeral 18. The side plate is Z-shaped in cross section and embodies a horizontally extending web 19, an inner upstanding flange 20 and an outer depending flange 21. The side plate is reinforced by means of a heavy plate member 22 which is secured as by means of riveting to the upstanding flange 20 of the side plate and which does not encroach upon the clear height of door opening provided in each of the side walls.

Figure 3:
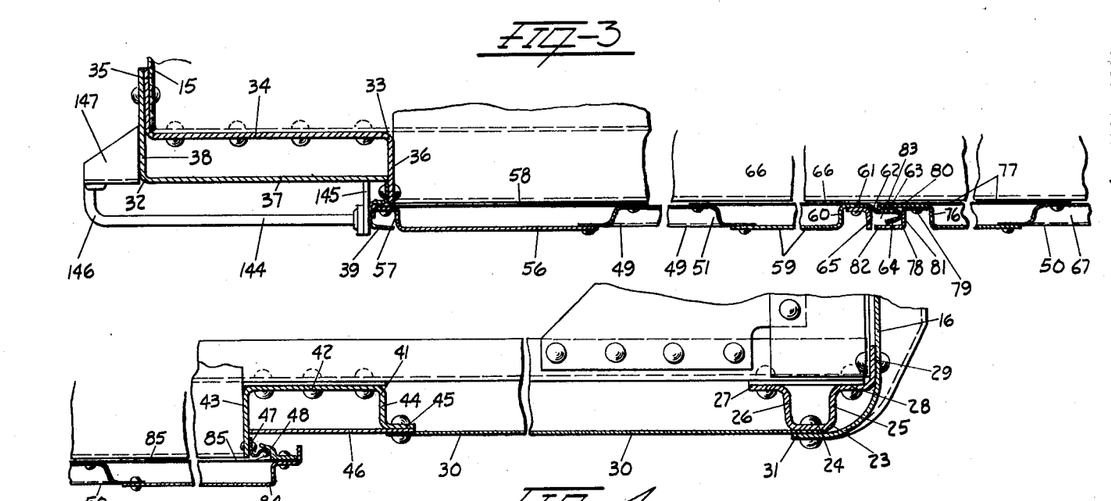
Fig. 3 is a horizontal section taken on line 3—3 of Fig. 1, this view being broken to illustrate the structure on a larger scale.
Figure 4:
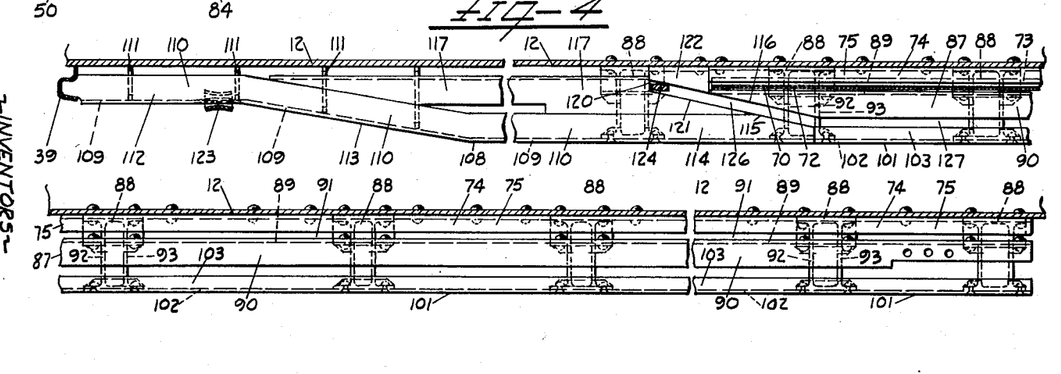
Fig. 4 is a horizontal section taken on line 4—4 of Fig. 1, this view being broken to show the structure on a larger scale.

Corner posts are utilized to secure together the side and end walls as shown in Fig. 3 of the drawings. One of these corner posts 23 embodies a web 24, inwardly extending legs 25 and 26 and oppositely extending flanges 27 and 28. The web 24 and flanges 27 and 28 lie substantially parallel with the side walls of the car. The flange 28 is bent at a right angle to form a flange 29 which lies parallel to the end walls of the car. The sheathing 30 of the side walls and a flange 31 formed on the car end are secured as by means of riveting to the web 24 of the corner post. The end wall is secured as by means of riveting to the flange 29. The corner post 23 is utilized at diagonally opposite corners of the box car.

At the other diagonally opposite corners of the box car corner posts are utilized having different construction from the corner posts 23. Each of these corner posts which are designated by the reference numeral 32 embodies an inner plate member 33 having a web 34 disposed parallel to the side wall, an inwardly extending flange 35 at one end of the web which lies parallel and is secured to the adjacent end wall and an outwardly extending flange 36 which lies at the other end of the web 34. Each of the corner posts 32 also embodies a flange 37 which lies parallel to the side wall and an inwardly extending flange 38 which overlaps the flange 35 and is secured thereto and to the end wall as by means of rivets. The flange 36 projects outwardly beyond the flange 37 to which it is secured as by means of welding and provides means to which a front door stop 39 is secured. It will be apparent by virtue of the instant invention that the diagonally opposite corner posts described immediately above are made to function as door posts of the car as well.

Each corner post 32 defines one end of a door opening 40 of extraordinary length formed in each side wall of the box car 10 and disposed in diagonally opposite ends of the side walls. In the embodiment illustrated the door opening extends for approximately half the length of the car. The other end of the door opening is defined by a door post 41 which embodies a substantially channel-shaped member having a web 42 parallel to the side wall, outwardly extending flanges 43 and 44 and a flange 45 which is parallel to the side wall. The flange 43 lies contiguous with the door opening and extends outwardly beyond a plate member 46 secured to this flange and to flange 45 so as to lie parallel with the web 42. The projecting portion of flange 43 provides support for a spark strip 47 which is adapted to be engaged by a sealing strip 48 secured to the rear margin of one of the double doors adapted to close each of the door openings.

Figure 1:
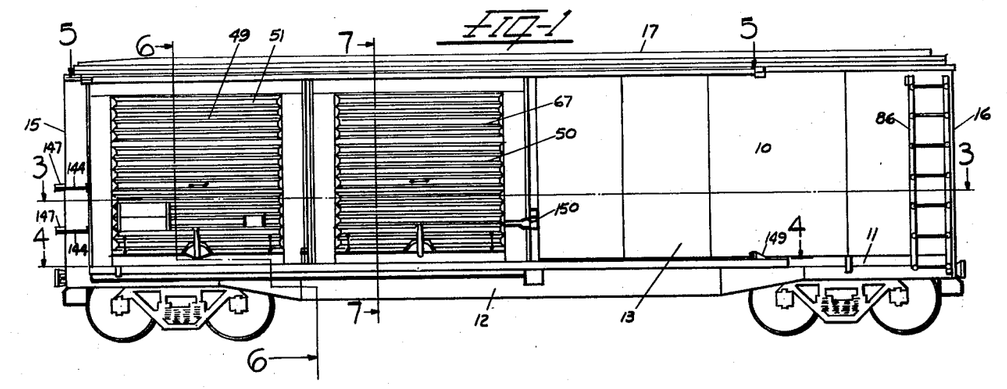
Fig. 1 is an elevation of a box car embodying the instant invention, the doors of the car being shown in closed position.
Figure 2:
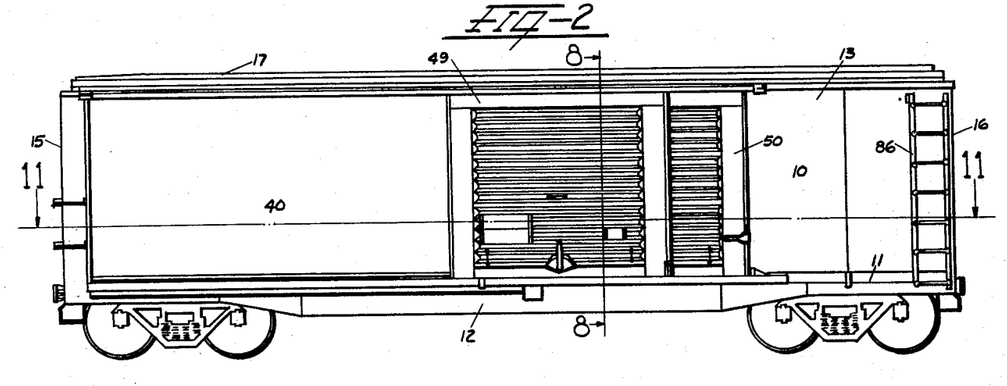
Fig. 2 is a view similar to Fig. 1 showing one of the two doors fully opened and the other door partly open and in lateral overlapping relationship with the first door.
Figure 6:
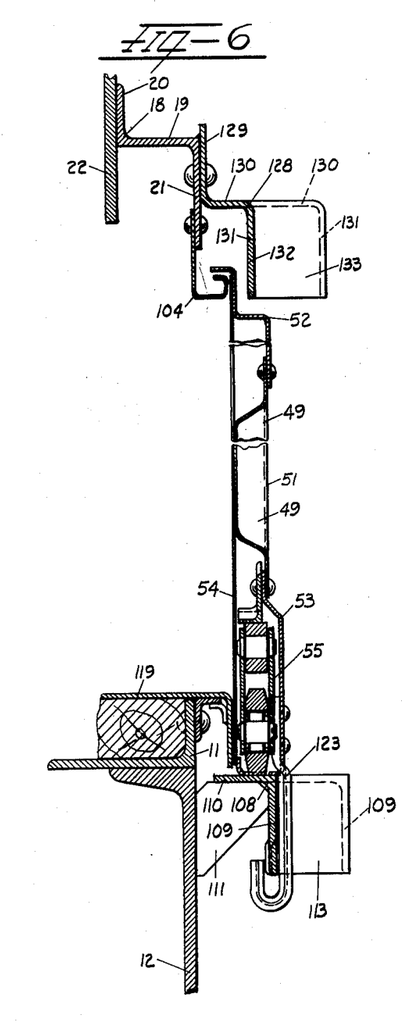
Fig. 6 is a vertical section taken on line 6—6 of Fig. 1.

These doors which are shown in Figs. 1 and 2, and in greater detail in Fig. 3, are designated by the reference numerals 49 and 50. The door 49 embodies a horizontally corrugated metallic panel 51. The upper margin of the panel is reinforced by means of a substantially W-shaped plate 52. The lower margin is reinforced by means of a plate member 53 and a backing plate 54 which as clearly shown in Fig. 6 of the drawings are associated and secured together so as to form a hollow portion adapted to receive lift mechanism 55 for elevating and supporting the door upon rollers for movement to open and closed positions. When in lowered position the door is adapted to be frictionally supported directly upon a supporting track secured to the box car as is shown in Fig. 6 of the drawings. The lift mechanism 55 is described and claimed in the patent to Thorvald Madland, No. 2,475,507, granted July 5, 1949. It may be referred to for a more detailed description of the mechanism.

The front marginal portion of the corrugated panel 51 of the door 49 is reinforced by means of a plate member 56 the forward marginal portion of which is formed into a substantially channel-shaped member 57 which is adapted to engage the front stop 39 to limit closing movement of the door. The front marginal portion of the panel 51 is also reinforced by a backing plate 58 which is secured to the panel and to the channel-shaped portion 57 of the reinforcing plate 56 and cooperates therewith to provide a sturdy tubular reinforcement for the panel. The rear marginal portion of the metallic panel 51 is reinforced by means of a plate member 59 which is flanged inwardly as indicated at 60 and then outwardly in substantially the inner plane of the panel as indicated at 61. The flange 61 is offset outwardly as shown at 62, then extended rearwardly as flange 63. A return flange 64 is formed on flange 63. A reinforcing angle 65 is secured to flange 61 and to the rear margin of a reinforcing backing plate 66 which engages the inner surface of flange 61. The forward edge of the backing plate 66 is secured to the metallic panel 51 and cooperates therewith and with the reinforcing plate 59 to provide a sturdy tubular reinforcement for the rear edge of the panel.

The door 50 embodies a corrugated metallic panel 67 similar in construction to the metallic panel 51. The upper margin of the panel 67 is reinforced by means of a substantially W-shaped member 68 similar in construction to the member 52. The lower margin of the metallic panel 67 is reinforced by means of a plate member 69 and a backing plate 70, which cooperate with the metallic panel to provide a sturdy tubular portion adapted to receive lifting and supporting mechanism 55. At its lower portion the plate 69 is flanged inwardly as indicated at 71, then downwardly as shown at 72 for securement to the lower portion of the backing plate 70 and then inwardly as shown at 73. The flange 73 is adapted to lie beneath the outwardly extending horizontal flange 74 of angle member 75 which is secured as by means of riveting to the side sill reinforcement 12. The horizontal flange 74 thus serves as a baffle to prevent foreign matter from blowing up into the car.

The front marginal portion of the metallic panel 67 is reinforced by means of a substantially Z-shaped member 76 and by a backing plate 77 which cooperates with the panel and the Z-shaped member 76 to provide a sturdy tubular reinforcement for the front margin of the panel. The front edge of the panel 67 is additionally reinforced by means of a Z-shaped member 78 having an inner flange 79 secured to the inner flange 80 of the Z-shaped member 76, an outwardly extending web 81 and a forwardly extending outer flange 82. The flange 80 of the Z-shaped member 76 extends forwardly beyond the web of the Z-shaped member 78 and cooperates with the latter and with the flange 82 to provide a pocket 83 which is adapted to receive the flanges 63 and 64 of the reinforcing member secured to the rear edge of door 49. It will be apparent from reference to Fig. 3 of the drawings that the doors 49 and 50 are in alignment when they are closed.

The rear margin of the metallic panel 67 of door 50 is reinforced by a substantially W-shaped plate 84 and by a backing plate 85 secured at one end to the panel 67 and at the other end to the reinforcing plate 84 and cooperating therewith to provide a sturdy tubular reinforcement for the rear margin of the metallic panel. The sealing strip 48 referred to hereinabove is positioned upon the backing plate 85 and is secured thereto and to the reinforcing plate 84 as by means of rivets.

The box car 10 provides adequate space between the door post 41 and the ladder 86 secured to the side wall adjacent to an end of the car for the reception of the door 50 when it is moved to full open position. To support the door and guide the lower portion thereof in its movement to open and closed positions an angle track 87 supported from the car by a plurality of brackets 88 is provided. The angle track 87 is arranged with flange 89 positioned vertically and in spaced relationship to the horizontal flange 74 of angle member 75. The flange 90 of the angle track 87 extends horizontally outwardly from the flange 89. The angle member 75 and the angle track 87 thereby provide a longitudinally extending space 91 which lies parallel throughout its length to the side wall of the box car for a purpose which will hereinafter appear.

The track supporting brackets 88 are identical in construction and embody spaced webs 92 and 93 which extend outwardly from a substantially W-shaped portion 94. This portion of the bracket provides a vertical flange 95 by means of which the bracket is secured to the side sill reinforcement 12 as by means of rivets. It also provides an outwardly extending flange 96 which serves to space an upwardly extending vertical flange 97 from the side sill reinforcing member and the angle 75. The vertical flange 97 terminates in an outwardly extending horizontal flange 98. The flange 98 is interrupted by means of a substantially rectangular slot 99 which also extends into the webs 92 and 93 for a reason later described. A vertical flange 100 depends vertically from the outer portion of flange 98 and together with the latter flange serves to support and secure an angle track member 101 which is fastened to the flange 100 of the bracket as by means of rivets. These rivets pass through the vertical leg 102 of the track member 101 which is arranged so that the horizontal leg 103 thereof extends inwardly and terminates in spaced relationship to the horizontal flange 90 of the angle track 87 for a reason which will later be explained.

Since adequate space is provided for the full opening movement of the door 50 the latter moves throughout its travel to open and closed positions in a plane substantially parallel to the side wall of a box car. In order to retain and adequately guide the lower portion of the door in this movement the depending flange 72 of the reinforcing plate member 69 and the lower portion of the backing plate 70 which is secured to the flange 72 are disposed in the space 91 provided as hereinabove described. For this purpose the movement of the door is controlled by the angle 75 and the angle track 87.

Figure 7:
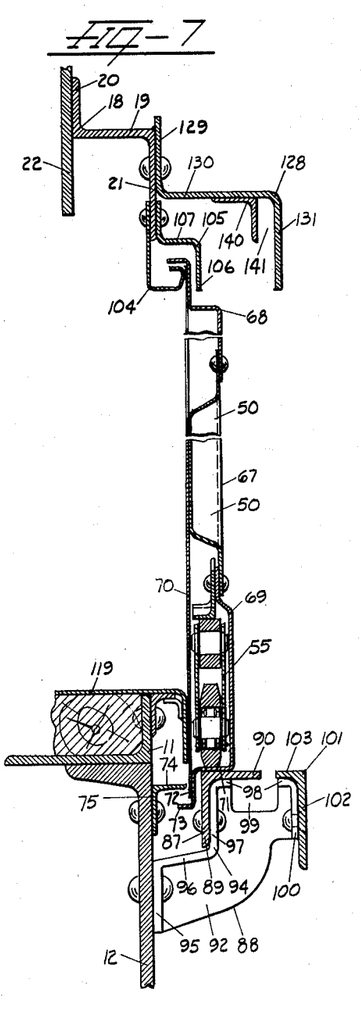
Fig. 7 is a vertical section taken on line 7—7 of Fig. 1.
Figure 8:
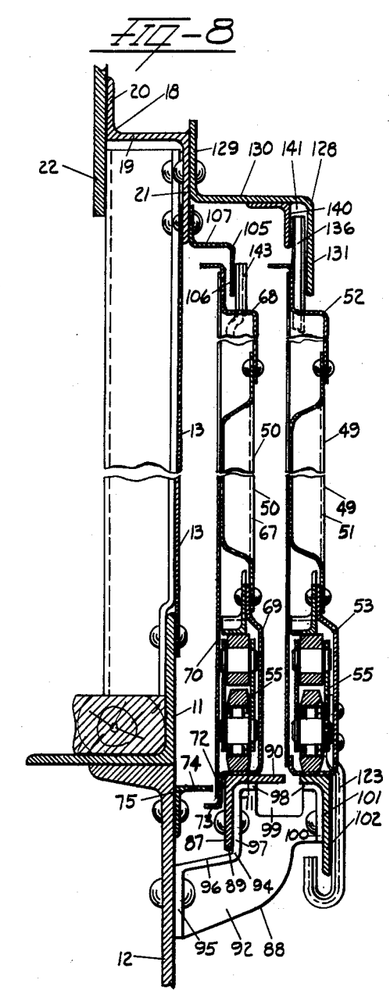
Fig. 8 is a vertical section taken on line 8—8 of Fig. 2.
Figure 9:
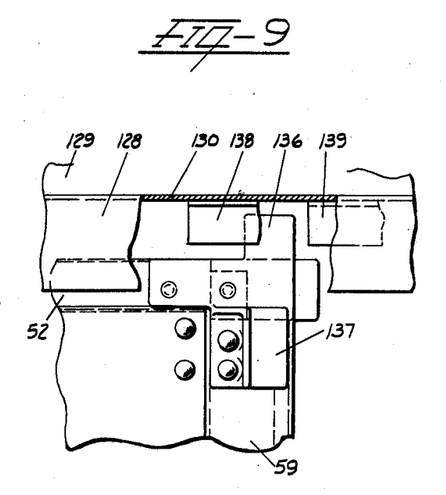
Fig. 9 is an elevation of the upper rear corner of the left hand door illustrating a door retainer.
Figure 10:
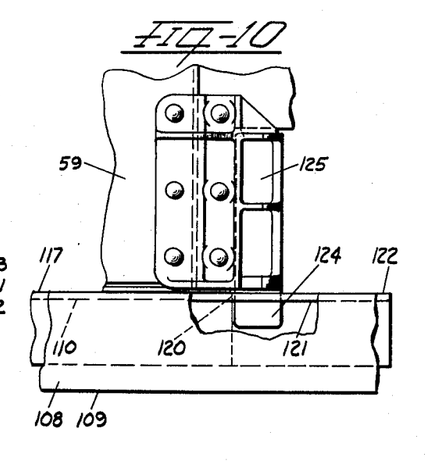
Fig. 10 is a view similar to Fig. 9 of the lower rear corner of the left hand door showing a door retainer.

Means is also provided for retaining and guiding the upper portion of door 50 in its movement parallel to the side wall. For this purpose a substantially J-shaped header 104 is secured and depends from the outer flange 21 of the side plate 18. The securing means which are shown as rivets also serve to fasten a substantially Z-shaped retaining member 105 to the flange 21 of the side plate. This member is arranged so that the flange 106 thereof extends downwardly from the horizontal web 107 in outwardly overlapping relationship with the upper panel reinforcing member 68 as is clearly shown in Fig. 7 of the drawings.

While the doors 49 and 50 are arranged in longitudinal alinement when they are in closed position it will be apparent from Figs. 1 and 2 of the drawings that the space between the door post 41 and the ladder 86 will not permit longitudinal alinement of the doors when they are in full open position. To overcome this inadequacy in the box car the instant invention disposes the door 49 in laterally overlapping relationship with the door 50 when the doors are in open position. To accomplish this and to support, retain and guide door 49 in its travel to open and closed positions a track 108 is utilized. This track which is in the form of an angle arranged so that flange 109 extends vertically downwardly and with flange 110 extending horizontally inwardly is supported from the side sill reinforcement 12 by means of plate brackets 111 secured to the reinforcement and to the flanges of the track as by means of welding. Track 108 embodies a portion 112 which extends rearwardly from the front door stop 39 substantially parallel to the side wall of the car.

A portion 113 of the track is inclined outwardly and rearwardly from the portion 112. From the inclined portion a portion of the track 114 extends rearwardly and parallel to the side wall of the car. Adjacent the end of the latter portion the horizontal inwardly extending flange 110 is sloped outwardly and rearwardly as indicated at 115 so as to lie parallel to a similarly sloping portion 116 of the outwardly extending flange 90 of the angle track 87. A plate member 117, the outer edge of which conforms substantially to the shape of the inner edge of flange 110 of track member 108 is secured to this edge as by means of welding. For the major portion of its length the inner edge of the plate 117 constitutes a rearward extension of the inner edge of the horizontal flange 110 of portion 112 of the track member. Plate 117 and the portion 112 of the track member 108 thereby lie below and extend across the space between the inner surface of door 49 and the depending flange 118 of the threshold plate 119 so as to serve as a baffle for preventing foreign matter from being blown upwardly into the car.

Adjacent its rear edge plate 117 is coped so as to provide an edge 120 which lies substantially at a right angle to the side wall. From this edge to the rear end of plate 117 the latter is sloped outwardly and rearwardly as indicated at 121 so as to lie parallel with the sloping portions 115 and 116. The slope 116 is extended forwardly and inwardly to the edge 120 of plate 117 by means of an angle filler 122 which is secured to the side sill reinforcement 12 as by means of rivets. The rear portion of track 108 which includes the sloping portion 115 abuts at its rear edge against the angle track 101 and is secured thereto as by means of welding so that in effect track 101 constitutes an extension of track 108.

Cooperating with the track structure described immediately above in order to retain and guide the lower portion of door 49 a hook-shaped member 123 secured to the lower portion of door reinforcing plate 53 adjacent to the forward edge of the door embraces vertical flange 109 of the angle track member 108. By reason of this relationship the forward lower portion of the door is guided outwardly from the side wall of the car by means of the sloping portion 113 and then parallel to the side wall by means of the portion 114 and the track member 101 into laterally overlapping relationship with door 50. The rear portion of door 49 is similarly guided by means of a lug 124 which depends from a bracket 125 secured as by means of rivets to the lower rear corner of door 49. Lug 124 extends into the rearwardly and outwardly inclined space 126 formed by the sloping edges 115, 116, 121 and the filler member 122 so as to guide the lower rear portion of the door outwardly away from the side wall of the car. Since the space 126 communicates with space 127 provided between the flanges 90 and 103 which extend parallel to the side wall of the car, the latter portion of door 49 is then guided by means of lug 124 into laterally overlapping relationship with door 50 when the latter is open. The slots 99 provided in the webs 92 and 93 of the track supporting brackets 88 permit this movement of lug 124.

The upper portion of door 49 is similarly guided to permit the door to assume the lateral overlapping relationship with door 50. For this purpose a substantially Z-shaped retaining member 128 is provided. This retaining member embodies a vertical upstanding flange 129 by means of which it is secured to the depending flange 21 of the side plate 18 as by means of rivets. Retaining member 128 also includes an outwardly extending web 130 and a depending flange 131 which lies in outwardly overlapping relationship with the upper portion of door 49 (see Fig. 6). The depending flange 131 of the door retainer which lies adjacent to the forward margin of the door 49 when the latter is closed has a portion 132 which is parallel to the side wall of the car. From this portion flange 131 is sloped outwardly and rearwardly as shown at 133. Beyond the portion 133 flange 131 extends rearwardly in a portion 134 which lies parallel to the side wall of the car.

Figures 5, 11:
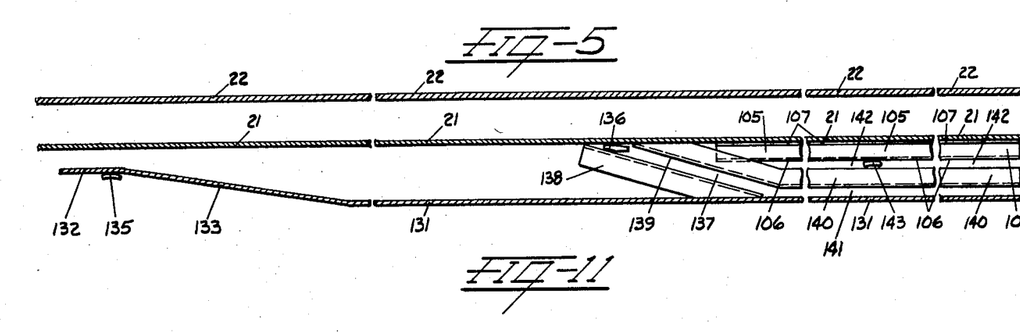
Fig. 5 is a horizontal section taken on line 5—5 of Fig. 1, parts being broken away to show the structure on an enlarged scale.
Fig. 11 is a horizontal section taken on line 11—11 of Fig. 2.

Adjacent to the upper forward corner of the door and secured thereto a guide member 135 cooperates with the depending flange 131 of the retaining member 128 in order to guide the forward portion of the door outwardly away from the car side and then parallel thereto into laterally overlapping relationship with the door 50 when the latter is open. The rear portion of door 49 is similarly guided by means of a lug 136 provided on a bracket 137 secured to the upper rear corner of the door. The lug 136 extends upwardly into an outwardly and rearwardly inclined space 137 which is provided by a rearwardly and outwardly inclined angle member 138 secured as by means of welding to the depending flange 21 of the side plate and the depending flange 131 of retaining member 128 and by a similarly inclined portion 139 of an angle guide member 140. From the inclined portion 139 this guide member extends rearwardly in parallel relationship to the side wall and in spaced relationship to depending flange 131 to provide a space 141 into which lug 136 extends in order to guide the rear portion of door 49 parallel to the side wall and into laterally overlapping relationship to door 50 when the latter is open. The guide member 140 (see Fig. 5) is spaced from the retaining member 135 for door 50 so as to provide space 142 for a retaining member 143 secured to the upper rear corner of door 50.

The disposition of the door opening 40 in diagonally opposite ends of the side walls 13 and 14 leaves space between the front door stops 39 and the adjacent ends of the car which is not sufficient to permit the usual securement of grab irons to the car. To overcome this inadequacy the grab irons 144 provided at diagonally opposite corners of the car are secured thereto at one end by means of plate members 145 which are welded to the corner posts and to the front stops 39 so as to serve the additional function of bracing the front stops against impact of the doors. The opposite ends of the grab irons are flanged inwardly as indicated at 146 and are secured as by means of rivets to brackets 147 fastened to the car ends as by means of welding. The brackets 147 extend from the ends of the car so as to constitute in effect an extension of these ends whereby grab irons of the length specified by the Interstate Commerce Commission Safety Rules can be utilized.

In opening the doors from the closed position shown in Fig. 1 of the drawings the door 50 is first moved along the track and door retainer to its full open position which is determined by the back stop 148. The door 50 in its travel to open position moves longitudinally of and parallel to the side wall of the car. It will be understood that in such movement the lever of the lift mechanism 55 is depressed so that the door is supported upon anti-friction rollers for ease of movement.

Thereafter door 49 is opened. In opening movement door 49 moves longitudinally and outwardly from the side wall, such movement being obtained by the track and top door retainer structure described above. In its subsequent movement door 49 moves longitudinally of and parallel to the side wall of the car in laterally overlapping relationship with door 50 until such movement is arrested by back stop 149.

To close the doors 49 and 50 door 49 is first moved to closed position. The steps in this movement will be the reverse of those described in the opening movement of the door. When it is fully closed door 49 will lie in the same plane as door 50 which is then moved to closed position. Since the doors 49 and 50 lie in the same plane the flanges 63 and 64 at the rear edge of door 49 will enter the pocket 83 formed at the front edge of door 50 thereby providing an effective seal at the meeting edges of the two doors to exclude the entry of foreign matter into the car.

When the doors are fully closed they are locked in this position by a lock designated generally by the reference numeral 150 which engages the rear edge of door 50. No claims are made in the instant application to the structure of the lock which will be made the subject of a separate application.

It will be apparent that numerous changes and modifications in the details of the invention will be clear to those skilled in the art. It is intended, therefore, that all such modifications and changes be comprehended within this invention which is to be limited only by the scope of the claims appended hereto.

We claim:

1. A railway box car comprising side walls, fixed end walls, corner posts, certain of said corner posts being secured to adjacent side and end walls in diagonally opposite corners of said car, the other of said diagonally opposite corner posts being secured to said end walls in spaced relationship to said side walls, each of said side walls having a door post, said door posts being spaced respectively from said latter diagonally disposed corner posts, said latter corner posts also constituting door posts cooperating with said first door posts to define diagonally opposite door openings of extraordinary width in said side walls, and door stops secured to said latter diagonally opposite corner posts.

2. A railway box car comprising side walls, fixed end walls, corner posts, certain of said corner posts being secured to adjacent side and end walls in diagonally opposite corners of said car, the other of said diagonally opposite corner posts being secured to said end walls in spaced relationships to said side walls, each of said side walls having a door post positioned approximately midway between said end walls, said latter diagonally disposed corner posts also constituting door posts cooperating with said first door posts to define diagonally opposite door openings of extraordinary width in said side walls, and door stops secured to said latter diagonal corner posts.

3. A railway box car comprising side walls, fixed end walls, corner posts, certain of said corner posts being secured to adjacent side and end walls in diagonally opposite corners of said car, the other of said diagonally opposite corner posts being secured to said end walls in spaced relationship to said side walls, each of said side walls having a door post, said door posts being spaced respectively from said latter diagonally disposed corner posts, said latter corner posts also constituting door posts cooperating with said first door posts to define diagonally opposite door openings of extraordinary width in said walls, door stops secured to said latter diagonally opposite corner posts, and a plurality of sliding doors for closing each of the door openings, said doors being longitudinally alined when closed and laterally overlapped when opened, and means for positioning certain of said doors in laterally overlapped relationship with the other of said doors when said certain doors are opened, said plurality of doors being moved in the same direction beyond the door openings to completely expose the same, said doors when open lying in transverse relationship with said side walls.

4. A railway box car comprising side walls, fixed end walls, corner posts, certain of said corner posts being secured to adjacent side and end walls in diagonally opposite corners of said car, the other of said diagonally opposite corner posts being secured to said end walls in spaced relationship to said side walls, each of said side walls having a door post, said door posts being spaced respectively from said latter diagonally disposed corner posts, said latter corner posts also constituting door posts cooperating with said first door posts to define diagonally opposite door openings in said side walls, front door stops secured to said latter diagonally opposite corner posts, a plurality of doors for closing each of the door openings, said doors being longitudinally alined when closed and certain of said doors engaging said door stops, the portions of said side walls which extend from said first door posts to said first mentioned diagonally opposite corner posts being too short to accommodate said doors in longitudinal alinement when said doors are open, and means on said car above and below the door openings cooperating with said doors for retaining the latter on said car and guiding them to laterally overlapping open position, said plurality of doors being moved in the same direction beyond the door openings to completely expose the same, said doors when open lying in transverse relationship with said side walls.

5. A railway box car having side walls, diagonally opposite door openings of extraordinary width formed in said side walls, a plurality of sliding doors for closing each of said door openings, said doors being alined when closed, a fixed track for supporting said plurality of doors secured to each side of said car below a door opening, said tracks supporting certain of said doors for rectilinear longitudinal movement and the other of said doors for rectilinear longitudinal and lateral movements, each of said tracks having a tread and an outer depending flange extending substantially from end to end of said track, an outwardly and rearwardly inclined portion including said depending flange adjacent to the front end of said track, an outwardly and rearwardly inclined slot formed in said tread and extending substantially from the rear edge of said other doors, said slot communicating with a second slot in said tread which extends longitudinally substantially to the rear end of said track, said other doors having hook-shaped members secured adjacent to the front edge thereof and cooperating with said depending flange of said track to guide and retain said other doors on said track, and lugs secured to said other doors adjacent to the rear edge thereof, said lugs being received in said slots and cooperating therewith to guide and retain said doors during opening and closing movements, and guiding and retaining means secured to said side walls above the door openings similarly cooperating with the upper portions of said plurality of doors to guide and retain said doors on said car.

6. A railway box car having a side wall formed with a door opening, a sliding door for closing the door opening, and a fixed track secured to said car supporting said door for longitudinal and lateral movements relative to said car, said track having a tread and an outer depending flange extending substantially from end to end of said track, an outwardly and rearwardly inclined portion including said depending flange adjacent to the front end of said track, an outwardly and rearwardly inclined slot formed in said tread and extending substantially from the rear edge of said door, said slot communicating with a second slot in said tread which extends longitudinally substantially to the rear end of said track, said door having a hook-shaped member secured adjacent to the front edge thereof and cooperating with said depending flange of said track to guide and retain said door on said track, and a lug secured to said door adjacent to the rear edge thereof, said lug being received in said slots and cooperating therewith to guide and retain said door during opening and closing movements and guiding and retaining means secured to said side walls above the door openings similarly cooperating with the upper portion of said door to guide and retain said door on said car.

7. A railway box car comprising side walls, fixed end walls, corner posts, certain of said corner posts being secured to adjacent side and end walls in diagonally opposite corners of said car, the other of said diagonally opposite corner posts being secured to said end walls in spaced relationship to said side walls, each of said side walls having a door post, said door posts being spaced respectively from said latter diagonally disposed corner posts, said latter corner posts also constituting door posts cooperating with said first door posts to define diagonally opposite door openings of extraordinary width in said side walls, said latter diagonally opposite corner posts having outwardly extending vertical flanges contiguous with said door openings, and front door stops secured to said flanges.

8. A railway box car comprising side walls, fixed end walls, corner posts, certain of said corner posts being secured to adjacent side and end walls in diagonally opposite corners of said car, the other of said diagonally opposite corner posts being secured to said end walls in spaced relationship to said side walls, each of said side walls having a door post, said door posts being spaced respectively from said latter diagonally disposed corner posts, said latter corner posts also constituting door posts cooperating with said first door posts to define diagonally opposite door openings of extraordinary width in said side walls, said latter diagonally opposite corner posts having outwardly extending vertical flanges contiguous with said door openings, and front door stops secured to said flanges, and a plurality of sliding doors for closing each of the door openings, said doors being longitudinally alined when closed and laterally overlapped when opened, the front edge of certain of said doors engaging said door stops when said doors are closed, and means for positioning certain of said doors in laterally overlapped relationship with the other of said doors when said certain doors are opened, said plurality of doors being moved in the same direction beyond the door openings to completely expose the same, said doors when open lying in transverse relationship with said side walls.

9. A railway box car having side and end walls, said side walls having diagonally opposite door openings of extraordinary width, the door openings being defined in part by diagonally opposite corner posts, said corner posts comprising two plate members having transverse flanges secured to said end walls, transversely spaced inner and outer flanges extending longitudinally from said transverse flanges and transverse flanges extending outwardly from said inner longitudinal flanges beyond said outer longitudinal flanges at said door openings, means securing said outer longitudinal flanges to said latter transverse flanges, and door stops secured to said latter transverse flanges outwardly of said outer longitudinal flanges.

10. In a railway box car having side and end walls, corner posts secured to diagonally opposite ends of said end walls and constituting also door posts of said car, door posts secured to said side walls in spaced relationship to said first mentioned posts and defining therewith door openings of extraordinary width in diagonally opposite corners of said car, a plurality of sliding doors for closing each of said door openings, said doors being alined when closed, a fixed track for supporting said plurality of doors secured to each side of said car below a door opening, said tracks supporting certain of said doors for rectilinear longitudinal movement and the other of said doors for rectilinear longitudinal and lateral movements, each of said tracks having a tread and an outer depending flange extending substantially from end to end of said track, an outwardly and rearwardly inclined portion including said depending flange adjacent to the front end of said track, an outwardly and rearwardly inclined slot formed in said tread and extending substantially from the rear edge of said other doors, said slot communicating with a second slot in said tread which extends longitudinally substantially to the rear end of said track, said other doors having hook-shaped members secured adjacent to the front edge thereof and cooperating with said depending flange of said track to guide and retain said other doors on said track, and lugs secured to said other doors adjacent to the rear edge thereof, said lugs being received in said slots and cooperating therewith to guide and retain said doors during opening and closing movements, and guiding and retaining means secured to said side walls above the door openings similarly cooperating with the upper portions of said plurality of doors to guide and retain said doors on said car.

References Cited in the file of this patent

UNITED STATES PATENTS

| | | |
|---|---|---|
| 304,222 | Morrison | Aug. 26, 1884 |
| 841,378 | Curtis | Jan. 15, 1907 |
| 1,303,984 | Stow et al. | May 20, 1919 |
| 2,114,754 | Wasberg | Apr. 19, 1938 |
| 2,154,951 | Madland et al. | Apr. 18, 1939 |
| 2,223,667 | Mussey | Dec. 3, 1940 |
| 2,243,113 | Mussey et al. | May 27, 1941 |
| 2,320,216 | Brister | May 25, 1943 |
| 2,680,268 | Rutherford | June 8, 1954 |
| 2,756,694 | Wardein | July 31, 1956 |
| 2,764,784 | McCall | Oct. 2, 1956 |

OTHER REFERENCES

Railway Age, "Why Not a Full-Door Box Car," August 22, 1955, pages 41 and 42.